United States Patent [19]
Califano et al.

[11] Patent Number: 5,351,310
[45] Date of Patent: Sep. 27, 1994

[54] GENERALIZED SHAPE AUTOCORRELATION FOR SHAPE ACQUISITION AND RECOGNITION

[75] Inventors: Andrea Califano; Rakesh Mohan, both of New York, N.Y.

[73] Assignee: International Business Machines Corporation, Armonk, N.Y.

[21] Appl. No.: 162,966

[22] Filed: Dec. 8, 1993

Related U.S. Application Data

[63] Continuation of Ser. No. 705,037, May 21, 1991, abandoned.

[51] Int. Cl.$^5$ .............................................. G06K 9/52
[52] U.S. Cl. .................................. 382/22; 382/25; 382/41
[58] Field of Search ............... 382/22, 25, 8, 41, 21; 348/125, 134, 135, 141

[56] References Cited

U.S. PATENT DOCUMENTS

| | | | |
|---|---|---|---|
| 3,069,654 | 12/1962 | Hough | 382/41 |
| 4,110,736 | 8/1978 | Kono | 382/22 |
| 4,115,761 | 9/1978 | Ueda et al. | 382/25 |
| 4,115,805 | 9/1978 | Morton | 358/107 |
| 4,183,013 | 1/1980 | Agrawala et al. | 382/22 |
| 4,388,610 | 6/1983 | Tsunekawa | 382/8 |
| 4,704,694 | 11/1987 | Czerniejewski | 364/513 |
| 4,747,153 | 5/1988 | Kouno et al. | 382/25 |
| 4,748,674 | 5/1988 | Freeman | 382/14 |
| 4,783,829 | 11/1988 | Miyakawa et al. | 382/22 |
| 4,817,183 | 3/1989 | Sparrow | 382/4 |
| 4,845,765 | 7/1989 | Juvin et al. | 382/21 |
| 4,933,865 | 6/1990 | Yamamoto et al. | 382/25 |
| 4,969,201 | 11/1990 | Takasaki et al. | 382/22 |

OTHER PUBLICATIONS

Califano et al., "Generalized Shape Autocorrelation", AAAI-90, Proceedings Eighth National Conference on Artificial Intelligence, vol. 2, Jul. 29–Aug. 3, 1990, pp. 1067–1073.

Bolle et al., "A Complete and Scalable Architecture for 3D Model–Based Vision", Proceedings, 5th IEEE International Symposium on Intelligent Control 1990, vol. 1, Sep. 5–7, 1990, pp. 212–219.

Y. Lamdan and H. J. Wolfson, "Geometric Hashing: A General and Efficient Model–Based Recognition Scheme," Proc. of the IEEE Second Int'l. Conf. on Computer Vision, pp. 238–249, Tampa, Florida, Dec., 1988.

*Primary Examiner*—Leo H. Boudreau
*Attorney, Agent, or Firm*—Sterne, Kessler, Goldstein & Fox

[57] ABSTRACT

The invention provides automatic acquisition and recognition of complex visual shapes within images. During an acquisition phase, models are derived from interest points acquired from a target shape. The models are stored in and can be retrieved from a lookup table via high dimension indices. When an image is inputted, triplets of interest points in the image are used to compute local shape descriptors, which describe the geometry of local shapes in the image. In turn, triplets of local shape descriptors are used to compute high dimension indices. These indices are used for accessing the lookup table having the models. The models are used for the automatic recognition of target shapes.

10 Claims, 9 Drawing Sheets

GENERALIZED SHAPE AUTOCORRELATION FOR SHAPE ACQUISITION AND RECOGNITION

This application is a continuation of application Ser. No. 07/705,037, filed May 21, 1991, now abandoned.

TECHNICAL FIELD

The present invention relates generally to the recognition of complex 2D visual shapes, which could be derived from a viewing of 3D objects, and more particularly, to the automatic acquisition and recognition of complex visual shapes which are not easily modelled by conventional analytic techniques.

BACKGROUND ART

Automated systems for recognizing objects are increasingly being used in a large variety of technical fields, for example, biomedicine, cartography, metallurgy, industrial automation, and robotics. Moreover, many businesses are investing huge amounts of money and capital on the research and development of machine vision systems and elated data processing systems which can automatically and accurately identify objects, often referred to as "target objects."

Automated object recognition systems are becoming more and more sophisticated as data processing techniques advance sophistication. Most of the practical recognition systems in the conventional art employ methods involving the derivation of models to be used for recognizing objects in an image scene. An image scene in the context of this document is a two-dimensional (2D) representation, which for instance, could be derived from appearance data retrieved from a three-dimensional (3D) object at different viewpoints.

Furthermore, in most systems, data for deriving the models is inputted manually. However, in a few high-end automated systems, data can be learned via some sort of image capturing device, for example, a camera or scanner.

The model-based techniques have been conceptualized as having two phases: an object acquisition phase and a subsequent object recognition phase. More specifically, models of target objects are initially precompiled and stored during the acquisition phase, independently of the image scene. Then, the occurrences of these objects within an image scene are determined during the recognition phase by comparison of the sampled data to the stored models.

The task of recognizing objects in a scene is often complicated by rotation (vantage point), translation (placement), or scaling (size) of the object in a scene. In addition, the task may further be complicated by the partial concealment, or "occlusion", of a target object possibly caused by overlaps from other objects or some other adverse condition.

Some recognition systems employ "parametric" techniques, or mathematical parameter transforms. In parametric techniques, the spatial representation of an image in orthogonal coordinates is transformed into a representation based upon another coordinate system. Analysis of the image then takes place based upon the latter coordinate system. The methodology of using parametric techniques originated in U.S. Pat. No. 3,069,654 to Hough, involving the study of subatomic particles passing through a viewing field.

Many of the commonly used parametric techniques are interrelated and have evolved over years of experimentation since the Hough patent. For a general discussion in regard to the use of parametric techniques for shape identification, see D. H. Ballard, "Parameter nets: A theory of low level vision," *Proceedings of the 7th International Joint Conference on Artificial Intelligence*, pp. 1068–1078, August 1981.

Well known conventional parametric techniques include "alignment techniques", "Hough Transform techniques", and "geometric hashing". Although not particularly relevant to the present invention, alignment techniques are discussed in the following articles: D. P. Huttenlocher, S. Ullman, "Three-Dimensional Model Matching from an Unconstrained Viewpoint," *Proceedings of the 1'st International Conference on Computer Vision*, pp. 102–111, London, 1987, and D. P. Huttenlocher, S. Ullman, "Recognizing Solid Objects by Alignment," *Proceedings of the DARPA Image Understanding Workshop*, vol. II, pp. 1114–1122, Cambridge, Massachusetts, April 1988. In regard to Hough Transform techniques, which also are not particularly relevant to the present invention, see D. H. Ballard, "Generalizing the Hough Transform to Detect Arbitrary Shapes, "*Pattern Recognition*, vol. 13(2), pp. 111–122, 1981.

Geometric hashing is an often favored technique and is considered proper background for the present invention. In geometric hashing, models of objects are represented by "interest points." An orthogonal coordinate system is defined based on an ordered pair of interest points, sometimes referred to as the "basis pair." For example, the first and second interest points could be identified respectively as ordered pairs (0,0) and (1,0). Next, all other interest points are represented by their coordinates in the coordinate system.

The foregoing representation allows for comparison of objects which have been rotated, translated, or scaled, to the interest points of the model. Furthermore, the representation permits reliable comparison of the model to occluded objects, because the point coordinates of the occluded object in the sampled scene have a partial overlap with the coordinates of the stored model, provided both the model and scene are represented in a coordinate system derived from the same basis pair. However, occlusion of one or more of the basis points will preclude recognition of the object.

To avoid such a condition, interest points are represented in all possible orthogonal coordinate systems which can be derived from all of the possible basis pairs of interest points. Each coordinate is used to identify an entry to a "hash table." In the hash table, a "record" is stored which comprises the particular basis pair along with an identification of the particular model at issue.

During the object recognition phase, interests points initially are extracted from a scene. An arbitrary ordered pair is selected and used as the first basis pair. The coordinates of all other interests points in the scene are computed utilizing this basis pair. Each computed coordinate is compared to the coordinate entries of the hash table. If a computed coordinate and respective record (model, basis pair) appears in the hash table, then the a "vote" is accorded the model and the basis pair as corresponding to the ones in the scene. The votes are accumulated in a "bucket." When a certain record (model basis pair) gets a large number of votes, then the record, and corresponding model, is adopted for further analysis.

Using the record, the edges of the specified model are compared against the edges in the scene. If the edges correspond, then the object is considered matched to the model specified in the adopted record. If the edges do not match, then the current basis pair is discarded and a new basis pair is considered.

For further discussions in regard to geometric hashing, consider: Y. Lamdan, H. J. Wolfson, "Geometric hashing: a general and efficient model-based recognition scheme," *Proceedings of the 2nd International Conference on Computer Vision,* December 1988; J. Hong, H. J. Wolfson, "An Improved Model-Based Matching Method using Footprints," *Proceedings of the International Conference on Pattern Recognition,* Rome, Italy, November 1988; Y. Lamdan, J. T. Schwartz, H. J. Wolfson, "On recognition of 3-D objects from 2-D images," *Proceedings of the IEEE International Conference on Robotics and Automation,* vol. 3, pp.1 1407–1413, Philadelphia, April 1988; and, finally, A. Kalvin, E. Schonberg, J. T. Schwartz, M. Sharir, "Two Dimensional Model Based Boundary Matching Using Footprints," *The International Journal of Robotics Research,* vol. 5(4), pp. 38–55, 1986.

Although to some degree effective, conventional parametric techniques, and specifically, conventional geometric hashing for the identification of complex visual shapes remains burdensome and undesirably time consuming in many circumstances. Moreover, geometric hashing is often unreliable because the performance of geometric hashing degrades significantly with only very limited amounts of clutter or perturbation in the sampled data. Geometric hashing can also be unreliable due to extreme sensitivity to quantization parameters. Finally, geometric hashing has limited index/model selectivity, oftentimes improperly accumulates excessive votes in each vote bucket, and has a limited number of useful buckets available in the hash tables.

DISCLOSURE OF INVENTION

The present invention provides for the acquisition and recognition of complex visual shapes.

During an acquisition phase, interest points are acquired from a target shape. A set of high dimensional indices are then derived from the interest points. Each of the indices has seven dimensions or more. The indices describe collectively a set of interest points along with the related geometry. For example, the indices can encode translation, rotation, and scale information about the shape(s) to be recognized.

During a recognition phase, interest points are observed from an inputted image. Further, it is recognized whether the target shape resides in the image by considering the high dimension indices.

In a specific implementation of the present invention, during acquisition and recognition, triplets of interest points of a target shape are transformed into local shape descriptors, which identify the interest points along with rotation and scale information about the triplet. Then, other triplets of the local shape descriptors are formed and are converted into the high dimension indices, which identify the local shape descriptors and also encode the translation, rotation, and scale information about the shape(s) to be recognized.

FEATURES AND ADVANTAGES OF THE INVENTION

The present invention overcomes the deficiencies of the prior art, as noted above, and further provides for the following additional features and advantages.

Generally, the present invention provides for the time-efficient automatic acquisition and recognition of complex visual shapes, which are difficult to identify using conventional parametric techniques, including conventional geometric hashing. In other words, the present invention enhances both accuracy and speed, which have traditionally been quid pro quos.

The global indices corresponding to a coordinate of an interest point are highly dimensional (7 or more characteristic dimensions). Moreover, these indices are very selective and invariant of Euclidean transformations. The highly dimensional indices overcome problems in conventional geometric hashing, such as limited index/model selectivity, excessive accumulation of votes in each bucket, limited number of useful buckets in the hash tables, and the undesirable extreme sensitivity to quantization parameters.

A model data base is provided which exhibits the properties of robustness (stability with respect to data perturbations), generalization, and recall from partial descriptions.

The methodology of the present invention can be implemented on commercially and inexpensive conventional computers.

The present invention exhibits both supervised and unsupervised learning of perceptual concepts, such as symmetry and the hierarchical organization of models into subparts.

It should be noted the above list of advantages is not exhaustive. Further advantages of the present invention will become apparent to one skilled in the art upon examination of the following drawings and the detailed description. It is intended that any additional advantages be incorporated herein.

BRIEF DESCRIPTION OF THE DRAWINGS

The present invention, as defined in the claims, can be better understood with reference to the text and to the following drawings.

BEST MODE OF CARRYING OUT THE INVENTION

Table Of Contents

A. Overview
B. Initialization—Local Table Shape Creation
C. Acquisition—Global Table Shape Creation
D. Recognition
1. Local Shape Description Extraction 2. Object Shape Recognition
A. Overview The present invention presents a parametric technique, i.e., using parameter transforms for the initial acquisition and then subsequent recognition of complex arbitrary shapes in an image. The present invention envisions three phases for operation: (1) a one-time initialization phase, (2) an acquisition phase, and (3) a recognition phase. An overview of the phases is described below with reference to FIG. 1.

Figure 1:
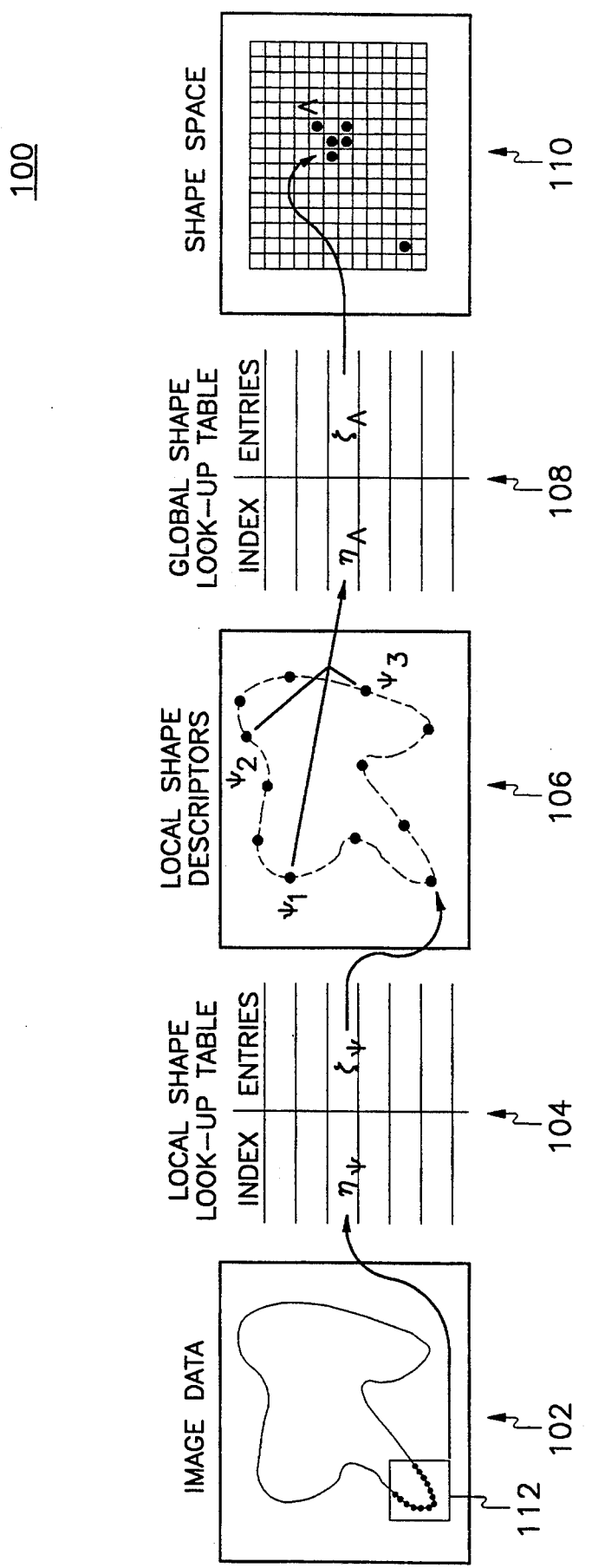
FIG. 1 graphically illustrates at a high level the system architecture and methodology of the present invention wherein a local shape table and a global shape table are used to implement a parametric technique.

During the initialization phase, a local shape table 104 of FIG. 1 is created by inputting local shapes to be recognized during the recognition phase. After creation, the table 104 thereafter serves as a lookup table for local shapes during the recognition phase.

The local shape table 104 is structured to have an index $\eta_\Psi$ for addressing a set of entries $\{\zeta_\Psi\}$. Each index $\eta_\Psi$ and each entry $\zeta_\Psi$ are in the form of tuples. A "tuple" refers to a listing of elements or variables having a specific ordering. Tuples are denoted by the brackets "<. . . >" in the document.

The index $\eta_\Psi$ and entry are derived by analyzing a "K-plet", a collection of K interest points, which could exist in an image, along with their associated local geometric properties, such as rotation and scale. In the preferred embodiment, "triplets" (K=3) of interest points are analyzed. During the initialization phase, the interest points are derived from synthetically generated images.

During the acquisition phase, target shapes in an image are learned and are used to derive the global shape table 108 of FIG. 1. First, local shapes are detected in the image. These local shapes are then used to acquire the target shape.

Specifically, interest points are initially acquired from target shapes in an inputted image, which target shapes are to be later recognized in any scene during the recognition phase. If the shape to be learned (acquired) is 2D, then as shown in FIG. 1, a single unoccluded image 102 of the target shape is presented to the system for acquisition.

The methodology as discussed in relation to 2D target shapes is equally applicable to 3D target objects. However, in the case of 3D target objects, different views are presented to the system in order to take into account a depth dimension, as is well known in the art. The views correspond to either discrete samplings of the Gaussian viewing sphere or different aspects of the model. For a discussion of modelling 3D objects, see J. Koenderink A. van Doorn, "The internal representation of solid shape with respect to vision," *Biological Cybernetics*, vol 32, pp. 211–216, 1979.

The interest points acquired from the image are analyzed in groups of K-plets. In the preferred embodiment, "triplets" (i.e., K=3) of interest points are analyzed. K-plets are is associated with a specific interest point (x,y) in the image 102.

Further, the LSDs are filtered in order to choose the best ones by conventional means. In the preferred embodiment, the conventional "best first" technique is utilized. The conventional "constraint satisfaction technique" could also be used to filter the LSDs. For a discussion of the constraint satisfaction technique, see D. H. Ballard, "Parameter nets: A theory of low level vision," *Proceedings of the 7th International Joint Conference On Artificial Intelligence*, pp. 1068–1078, August 1981; A. Califano, R. M. Bolle, and R. W. Taylor, "Generalized neighborhoods: A new approach to complex feature extraction," *Proceedings of the IEEE Conference on computer vision and Recognition*, June 1989; and R. Mohan, "Constraints Satisfaction networks for computer vision," *Progress in Neural Networks*, O. Omidvar Ed., Ablex, 1991.

Next, the filtered local shape descriptors are analyzed in groups of K-plets to derive the global shape table 108 of FIG. 1. In the preferred embodiment, "triplets" (K=3) of LSDs are analyzed to compute indicies $\eta_\Lambda$ and entries $\zeta_\Lambda$. The global shape table 108 is structured to have indices $\eta_\Lambda$ for addressing a set of entries $\{\zeta_\Lambda\}$. Each of the indices $\eta_\Lambda$ and entries $\zeta_\Lambda$ are in the form of tuples. Each tuple entry $\zeta_\Lambda$ comprises (1) a symbolic label $\lambda$, which uniquely identifies the model, (2) a set of geometric parameters $\beta$, used for computing the model's position, orientation, and scale in a scene, and (3) a support mechanism $\gamma$ for keeping track of the votes for the same values of $\lambda$, $\oplus$, and $\eta_\Lambda$. The geometric parameters $\beta$ are invariant with respect to translation, rotation and scale transformations in subsequent scenes.

During the recognition phase, an image is generated from a scene and inputted into the system. Interest points are derived from the image. Moreover, local shape descriptors are obtained just as they are in the acquisition phase, discussed previously.

By analyzing K-plets of the LSDs, a set of object shape hypotheses $\Lambda$ are mapped and accumulated in an object shape parameter space $\Sigma_\Lambda$. In the preferred embodiment, "triplets" (K=3) of LSDs are analyzed. Specifically, for each entry addressed by the index for a K-plet of LSDs, a new model hypothesis $\Lambda = <\lambda, \phi>$ is formed. The model hypothesis includes the model label $\lambda$ and its corresponding registration parameters $\phi$, computed from geometric parameters $\beta$, which encode information relating to the geometry of the K-plet. The registration parameters $\phi$ uniquely identify the shape, rotation of the shape, and the shape's scale.

An object shape hypothesis defined by the model label $\lambda$ and registration parameters is added to the global shape parameter space $\Sigma_\Lambda(\lambda, \phi)$.

Finally, the object shape hypotheses $\{\Lambda\}$ are filtered in the parameter space $\Sigma_\Lambda(\lambda, \phi)$ to select the best, mutually compatible, object shapes $\{\lambda\}$. The set of filtered object shape hypotheses $\{\Lambda\}_{selected}$ essentially comprise the shapes recognized and located in the scene.

In a general sense, the present invention is performing "spatial autocorrelation." "Spatial autocorrelation" in the context of this disclosure means that non-local spatial information is being correlated. In other words, groupings of interest points or LSDs, called K-plets which are spread across an image, are correlated to derive local shape descriptors $\Psi$, or object shapes $\Lambda$, which embed global shape information.

It should be noted that spatial autocorrelation to some extent involves the conventional Hough transform technique. However, in the Hough transform technique, only a single interest point is considered at a time, unlike in the present invention where a K-plet is considered. For a further discussion regarding spatial autocorrelation, see A. Califano, "Feature recognition using correlated information contained in multiple neighborhoods," *Proceedings of the 7th National Conference on Artificial Intelligence*, July 1988, pp. 831-836, and also, A. Califano, R. M. Bolle, and R. W. Taylor, "Generalized neighborhoods: A new approach to complex feature extraction," *Proceedings of IEEE Conference on Computer Vision and Pattern Recognition*, June 1989.

B. Initialization—Local Table Creation

During the initialization phase, the local shape table 104 of FIG. 1 is created. The methodology for creating the foregoing table is shown and will be described below in regard to FIG. 3.

The creation of the local shape table need only be performed once, and then the results can be stored in a transportable file (perhaps, for example, on a magnetic medium). The creation of the local shape table 104 can be considered an initialization process. In other words, when new target shapes are added to the system, the local shape table need not be recreated.

Figure 3:
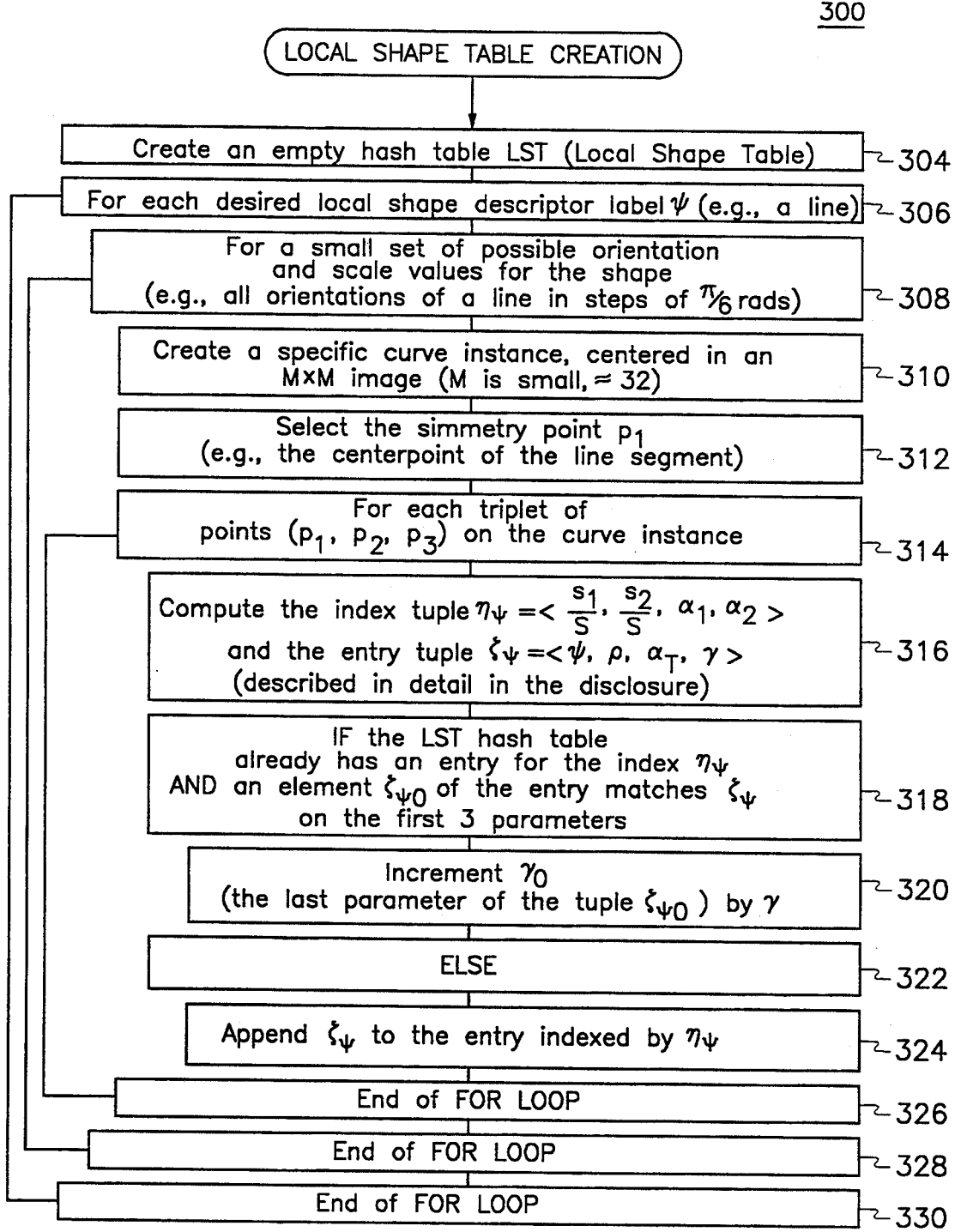
FIG. 3 illustrates a Flowchart for initialization phase of the present invention wherein the local shape table of FIG. 1 is created.

As illustrated in FIG. 3, the local shape table is created based upon the local shapes which are sought to be recognized by the system. First, as shown in a block 302, an empty local shape table is created. The local shape table is created in the form of a lookup table, where an index $\eta$ corresponds with a unique set of entries $\{\zeta\}$.

In a FOR LOOP enclosed by blocks 306 and 330, data corresponding to each of the curves desired to be recognized are inputted to the table 104. In this document, these curves are called "local shapes" and are accorded a specific local shape descriptor label for identification purposes.

The local shapes could be, for example, lines, circular arcs, elliptic arcs (minima and maxima of curvature), and so forth. Large sets of local shapes can be considered. In this regard see A. P. Blicher, "A shape representation based on geometric topology: Bumps, Gaussian curvature, and the topological zodiac," *Proceedings of the 10th International Conference on Artificial Intelligence*, pp. 767-770, August 1987.

These local shapes are "synthetically" drawn for the system. "Synthetically" means that the local shapes are automatically generated by the system. In other words, the shapes need not be created or drawn on a display screen or some other visual device.

Once local shapes are synthetically drawn, the manner in which they are quantized, or digitized, depends upon the way the local shapes are scaled or oriented. Accordingly, via a FOR LOOP enclosed by blocks 308 and 328, the local shapes are drawn at a few different scales and orientations (translations and rotations) to enhance the integrity of the ultimate models.

Next, each local shape is synthetically positioned symmetrically on an M,M array, as indicated in a block 310. At a block 312, the center point $p_1$ of the local shape is identified. Two other points $p_2$ and $p_3$ are arbitrarily selected along the local shape, to thereby derive a triplet of interest points. Each triplet forms a specific triangle, having the three points $p_1$, $p_2$, and $p_3$, and three sides $s_1$, $s_2$, and $s_3$. The local shape descriptor labels $\psi_i$ are associated with each of the points $p_1$.

A FOR LOOP enclosed by blocks 314 and 326 operates upon each triplet of interest points $p_1$, $p_2$, $p_3$ in order to derive the indices and entries in the local shape table 104.

At a block 316, for each triplet, an index $\eta\psi$ and a corresponding entry $\zeta\psi$ is computed and $\eta\psi$ is entered into the table 104 in the form of tuple at the location addressed by the index $\eta\psi$.

Essentially, the index $\eta$ is an address in the lookup table. The index $\eta\psi$ is generated as follows:

$$\eta_\psi = <\frac{s_1}{S}, \frac{s_2}{S}, a_1, a_2>$$

Figure 2:
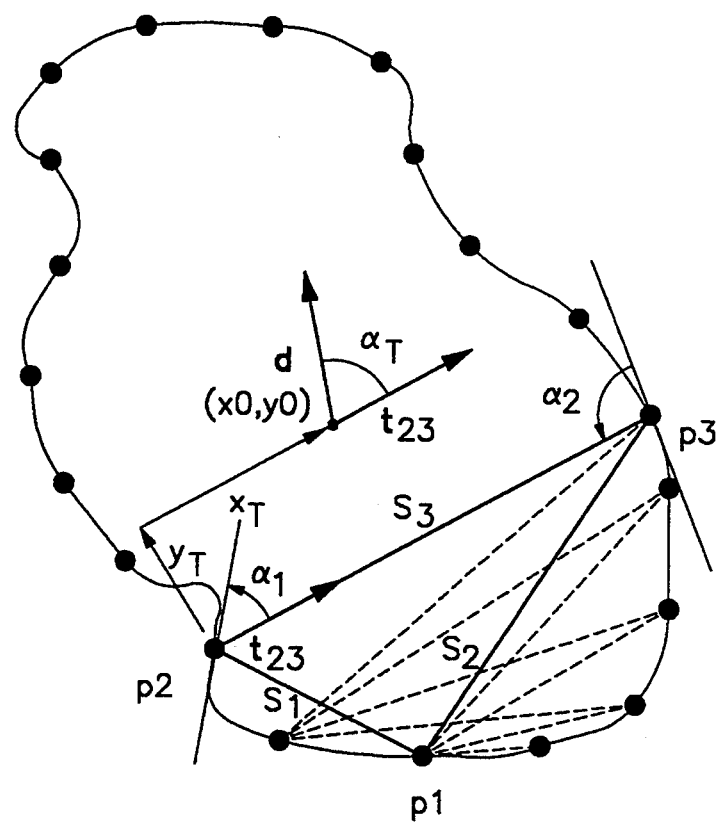
FIG. 2 shows a set of points from which triplets are formed wherein said points are either interests points from an image or local shape descriptors.

The two ratios $s_1/S$ and $s_2/S$, where $S=s_1+s_2+s_3$, essentially define the geometry of the triangle, as shown in FIG. 2. As further indicated in FIG. 2, the two angles $a_1$ and $a_2$ describe the $1^{st}$ order properties of the local shape with respect to the given triplet.

For the first point p, any properties higher than $0^{th}$ order are not used, because these properties are more noise sensitive and could bias the indices for all possible triangles generated for this feature.

The tuple entry $\zeta$, corresponding to the index $\eta$, is computed as follows:

$$\zeta_\psi = <\psi, \rho, a_{T\gamma}>$$

for each triplet, the tuple $<\psi, \rho, a_{T\gamma}>$ is inserted into the local shape table. Here, $\psi$ is the symbolic label for the local shape. As shown in FIG. 2, $a_T$ is the angle between the vector $t_{23}$ and the normal n to the contour at $p_1$ required to recover the shape orientation from the triplet.. $\rho=\mu/S$, where $\mu$ is a constant, is used for scale normalization.

After each index $\eta$ and corresponding set of entries are computed for each triplet of interest points, as shown in a block 318, the foregoing tuples are compared with other indices and entries in the local shape table 104 to determine if it is redundant. First, it is determined whether the table 104 already has entries $\zeta\psi$ at index $\eta\psi$.

If entries exist, then the parameters $\psi$, $\rho$, $a_T$ of the entry $\zeta\psi$ are compared with the like parameters in the already-existing entries at $\eta\psi$. If these parameters match, then the support mechanism $\gamma$ is accorded a vote, as indicated in a block 320.

However, if the table 104 does not have a matching entry at index $\eta\psi$, then the entry $\zeta\psi$ is entered at the location addressed by index $\eta\psi$ in the table 104, as shown in a block 324.

After the FOR LOOPS 314,326; 308,328; and 306,330 have completed operation, the local shape table has been completed.

C. Acquisition—Global Table Creation

During the acquisition phase of the present invention, target shapes are stored in the system for use as models to later recognize such shapes in a scene.

Figure 4:
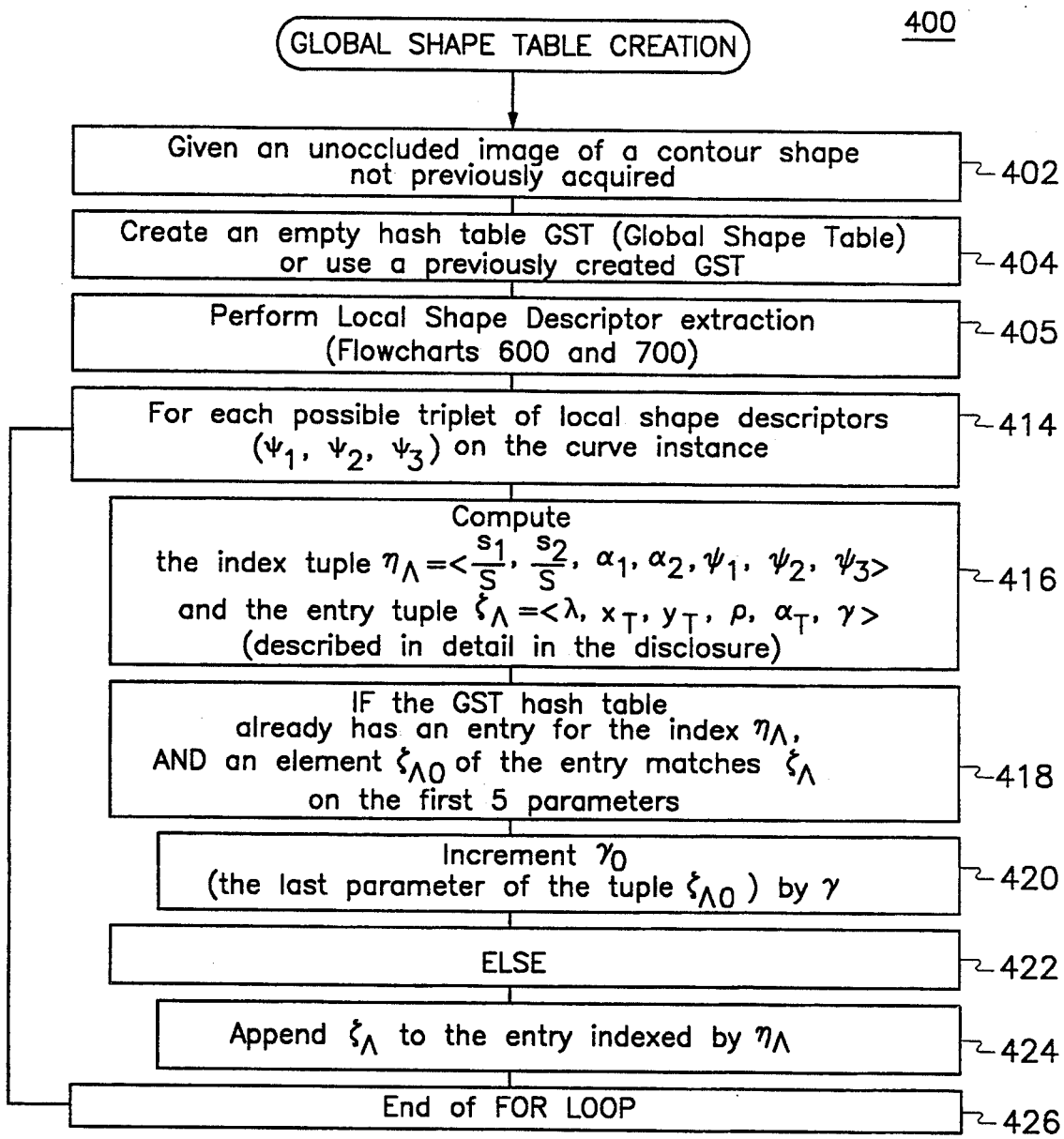
FIG. 4 shows a Flowchart for the acquisition phase of the present invention wherein the global shape table of FIG. 1 is created.

FIG. 4 illustrates the methodology for constructing the global shape table 108 of FIG. 1. The global shape table 108 is created when the images to be learned, or acquired, by the system are inputted. Note that the methodology of FIG. 4 is similar to that of FIG. 3. Moreover, similar steps within referenced blocks are denoted with similar reference numerals in the FIGS. 3 and 4 for easy comparison.

Initially, as indicated in a block 402 of FIG. 4, an unoccluded image is inputted into the system. The image may be a photograph, an image generated from a camera, or the like. With reference to FIG. 2, the image is inputted so that the position of the target shape's center of mass $(x_0, y_0)$ is computed. A scale (e.g., perimeter) $\mu$ and orientation vector d are then assigned. Further, a label $\lambda_A$ is provided to identify the target shape.

At block 404, an empty global shape table is created or an existing global shape table is utilized. Similar to the local shape table, the global shape table is created in the form of a lookup table, where an index $\eta$ corresponds with a unique set of entries $\{\zeta\}$.

Next, at a block 405, the local shapes of the image are detected. As an example, a local shape 112 is shown in FIG. 1. Essentially, the edges of the image along with the locations of the edges are considered and local shapes are computed. Moreover, the location of the local shapes is recorded. Finally, from the foregoing information, local shape descriptors $\Psi_1-\Psi_n$ are derived, as indicated at reference numeral 106 of FIG. 1. The procedure for detecting local shapes will be more fully discussed in regard to FIGS. 5 and 6 hereinafter.

For each triplet of local shape descriptors $\Psi_1$, $\Psi_2$, and $\Psi_3$, a tuple index $\eta_A$ and a corresponding tuple entry $\zeta_A$ is derived for the global shape table 108 of FIG. 1. This procedure is implemented via the FOR LOOP enclosed by blocks 414 and 426, which is analogous to the FOR LOOP enclosed by blocks 314 and 326 in FIG. 3. However the index $\eta_A$ of FIG. 4 has more parameters than the index $\eta_\psi$ of FIG. 3.

In FIG. 4, the index $\eta_A$ is computed and is specified as follows:

$$\eta_A = <\frac{s_1}{S}, \frac{s_2}{S}, \alpha_1, \alpha_2, \psi_1, \psi_2, \psi_3>$$

In comparison to the index $\eta_\Psi$, the index A comprises three additional parameters, namely, $\psi_1$, $\psi_2$, $\psi_3$, which are essentially the identification of the LSD triplet. Further, as with the triplets of interest points used to derive the local shape descriptors, the LSD triplets form a triangle with sides $s_1$, $s_2$, $s_3$, as shown in FIG. 2. The two ratios $s_1/S$ and $s_2/S$, where $S=s_1+s_2+s_3$, define the geometry of the triangle, as shown in FIG. 2. As further indicated in FIG. 2, the two angles $\alpha_1$ and $\alpha_2$ describe the $1^{th}$ order properties of the local shape with respect to the given triplet.

Again, for the first LSD $\Psi_1$ at point $p_1$, any properties higher than $0^{th}$ order are not used, because these properties are more noise sensitive and could bias the indices for all possible LSD triangles generated for this feature.

The tuple entry $\zeta_A$, corresponding to the index $\eta_A$, is computed as follows:

$$\zeta_A = <\lambda, x_T, y_T, \rho, \alpha_T, \gamma>$$

For each LSD triplet, the tuple $<\lambda, x_T, y_T, \rho, \alpha_T, \gamma>$ is inserted into the global shape table 108 at the location indexed by the index $\eta_A$.

As shown in FIG. 2, the position $(x_T, y_T)$ is the center of the shape's area in the new right hand coordinate system defined by the normalized vector $t_{23}$ and its corresponding orthonormal counterpart d, the ratio $\rho = \mu/S$, and the angle $\alpha_T$ between the two vectors $t_{23}$ and d. It should be noted that the geometric parameters $\beta = ((x_T, y_T), \rho, \alpha_T)$ are also scale and rotation invariant, and are used to recover position, orientation and scale of a feature from the corresponding 3 local shape descriptors $\{\psi_i, \psi_j, \psi_k\}$.

After each index $\eta_A$ and corresponding entry $\zeta_A$ are computed for each LSD triplet, as shown in a block 418, the foregoing tuples are compared with other indices and entries in the global shape table 108 to determine if it is redundant. First, it is determined whether the table 108 already has an index $\eta_A$.

If one exists, then the parameters $\lambda$, $x_T$, $y_T$, $\rho$, $\alpha_T$ of the entry $\zeta_A$ are compared with the like parameters in the already-existing entry. If these parameters match, then the support mechanism $\gamma$ (initially set to one) of the matching entry $\zeta_A$ is accorded a vote, as indicated in a block 420.

However, if the table 108 does not have a matching entry at index $\eta_A$, then the entry $\zeta_A$ is entered at the location addressed by index $\eta_A$ in the table 108, as shown in a block 424.

After the FOR LOOP 414,426 has completed operation, the global shape table has been completed. Accordingly, the system can now recognize shapes in target images.

D. Recognition

Figure 5:
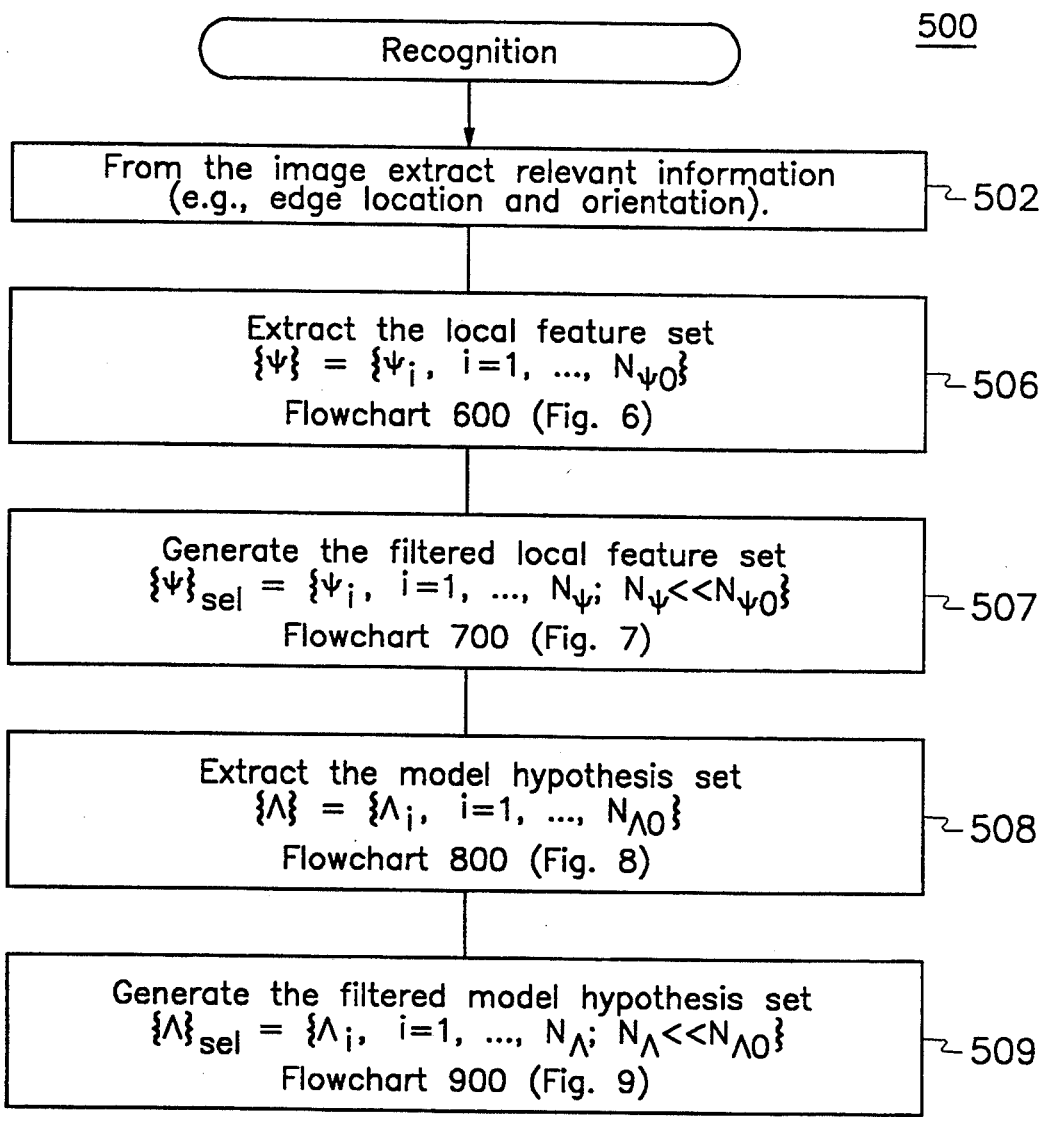
FIG. 5 illustrates a high level Flowchart for the recognition phase of the present invention wherein target shapes in an image are recognized based upon those shapes that were acquired as models in FIG. 4.

The methodology envisioned by the present invention for recognition of target shapes and objects will be discussed in detail hereafter in regard to FIGS. 5-9. FIG. 5 illustrates a high level Flowchart 500 showing the overall recognition methodology. FIGS. 6-9 comprise low level Flowcharts 600-900 describing in detail respective blocks 506-509 of FIG. 5.

With reference to block 502 of FIG. 5, the edges of an image to be recognized are extracted from a scene. This procedure is well known in the art.

At the next block 506, a "local feature set" is derived. The set comprises the LSDs $\Psi_1-\Psi_N$ for local shapes of the image. For example, a local shape is shown as reference numeral 112 in FIG. 1. A detailed description of this procedure will be discussed with reference to Flowchart 6, entitled "Local Shape Description Extraction" of FIG. 6, hereinafter.

Next, at the block 507, the local feature set $\{\Psi_1-\Psi_N\}$ generated in the previous step is filtered using any conventional filtering technique. The resultant filtered set of LSDs is extremely smaller than the original set of LSDs $\Psi_1-\Psi_N$. The resultant filtered set is illustrated at reference numeral 106 in FIG. 1.

In the preferred embodiment, the best first technique is utilized to filter the LSDs, which technique is well known in the art. As mentioned previously, any conventional filtering technique could be utilized, such as the constraint satisfaction technique. The specific implementation of this technique is shown in Flowchart 700, entitled "Filtering Local Shape Descriptors" of FIG. 7 Due to the well known nature and applicability of this technique, no discussion of the Flowchart 700 is undertaken.

At the next block 508, a set of model hypotheses $\Lambda_1-\Lambda_N$ is derived. This procedure is set forth in Flowchart 800, entitled "Object Shape Recognition", of FIG. 8.

The model hypothesis set $\{\Lambda_1-\Lambda_N\}$ generated in the previous step is filtered using any conventional filtering technique. The resultant filtered set is extremely smaller than the original set.

In the preferred embodiment, the first best technique is again utilized for filtering. The specific implementation of this technique is shown in Flowchart 900, entitled "Filtering Object Shape Hypotheses" of FIG. 9

Due to the well known nature and applicability of this technique, no discussion of the Flowchart 900 is undertaken.

The model hypotheses which survive the foregoing filtering, if any, are adopted as the shapes which are recognized in the scene. Thus, recognition has occurred.

1. Local Shape Description Extraction

Figure 6:
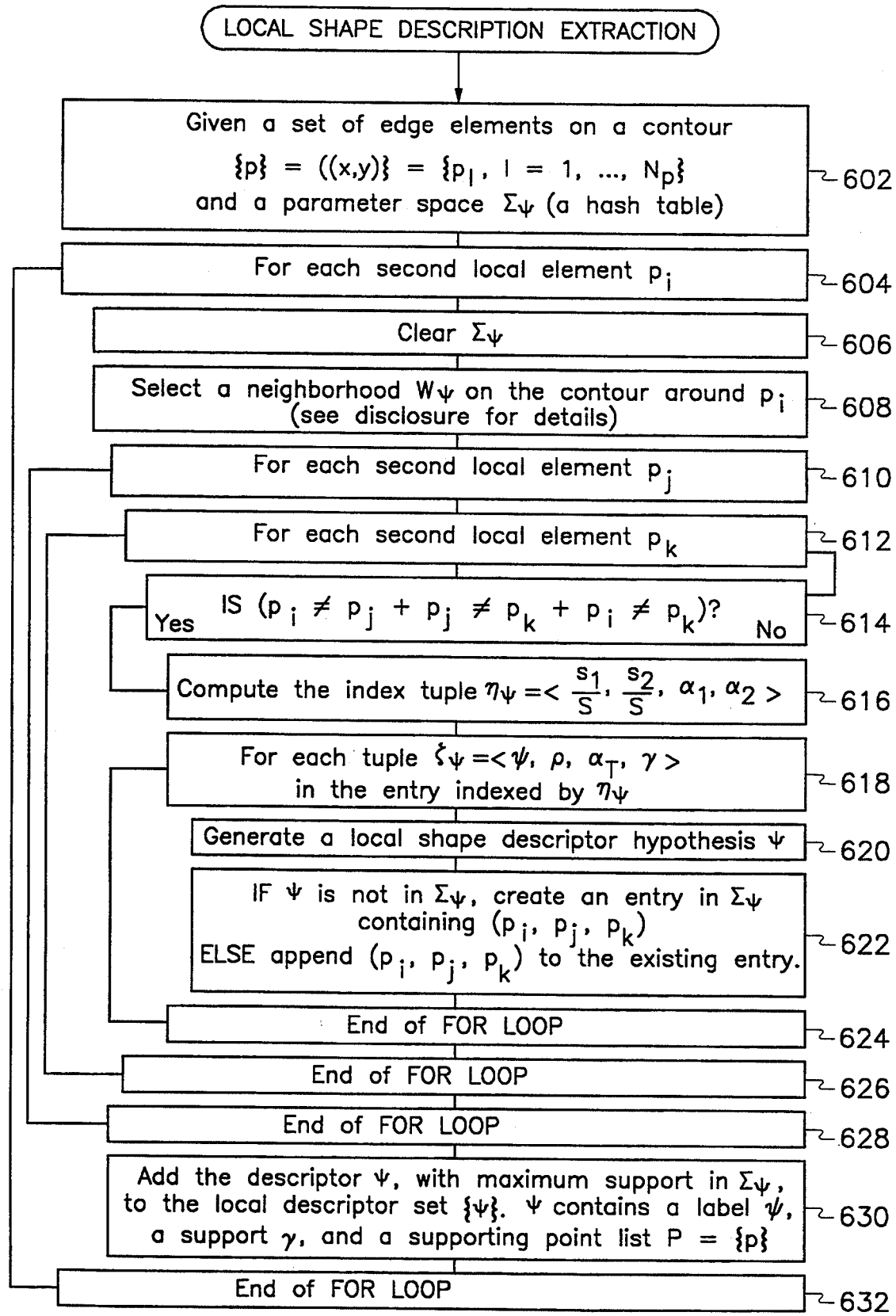
FIG. 6 shows a low level Flowchart for the extraction of local shape descriptors during the recognition phase of the present invention.
Figure 7:
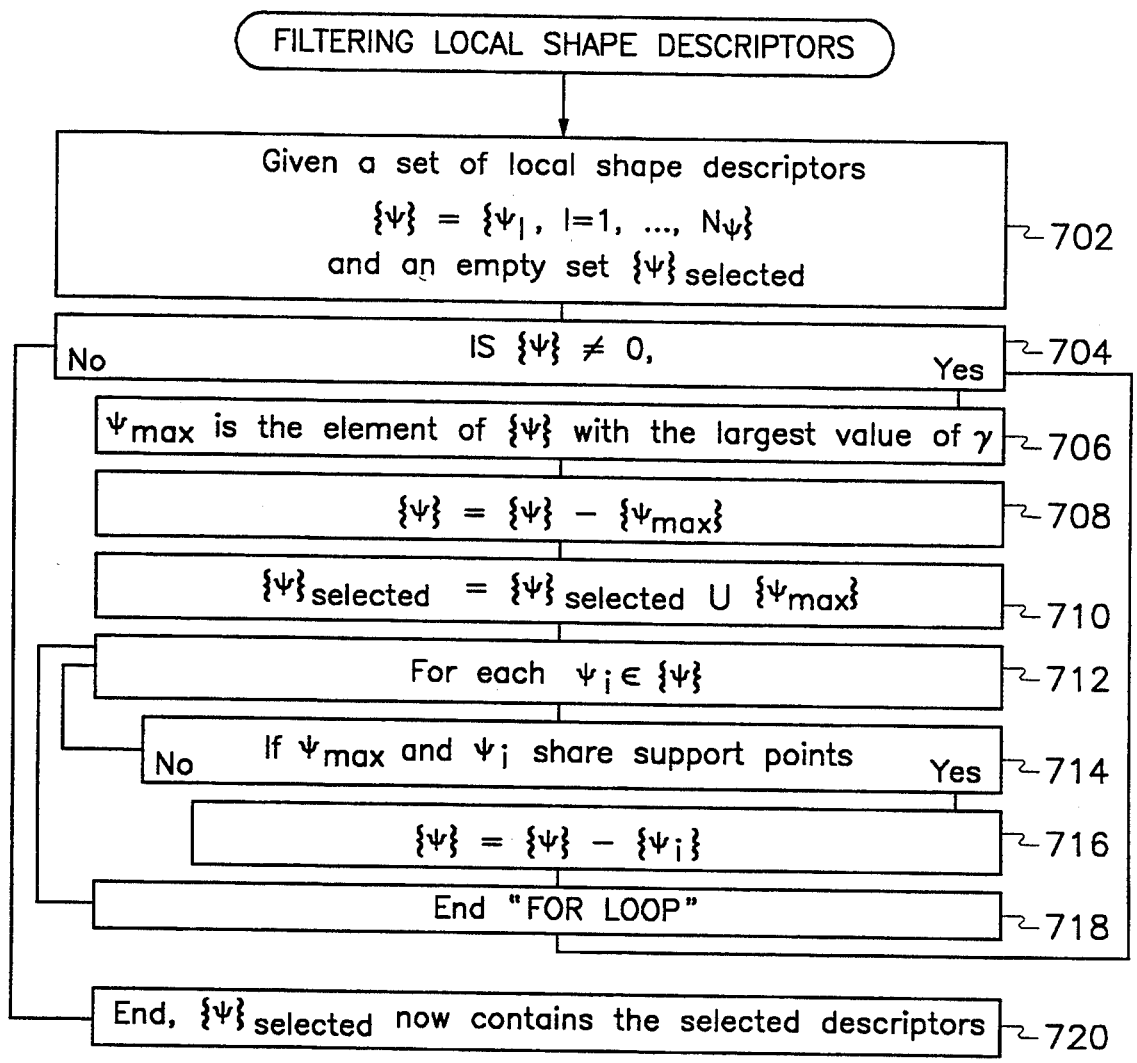
FIG. 7 illustrates a low level Flowchart for filtering the local shape descriptors of FIG. 6 during the recognition phase.

FIG. 6 illustrates an exemplary Flowchart 600 for the extraction of local shapes during the recognition phase. A local feature set is derived in FIG. 6. The set comprises the LSDs $\Psi_1$-$\Psi_N$ corresponding with local shapes of the image. For example, a local shape 112 is shown in FIG. 1.

First, at a block 602, N interest points p of an image are extracted from a scene using any of the numerous conventional techniques. The location of each interest point p is identified by orthogonal coordinates (x,y). This procedure is well known in the art. Moreover, a temporary parameter space $\Sigma_\Psi$ (a hash table) is generated for use in the proceeding steps of the Flowchart 600.

Next, a FOR LOOP enclosed by blocks 604 and 632 commences for each interest point $p_1$ of {p}. In the FOR LOOP 604,632, the parameter space $\Sigma_\Psi$ is first cleared, as indicated in block 606.

At block 608, a neighborhood W, on the contour around $p_1$ is selected. As will be discussed further below, triplets of interest points will be selected from the neighborhood W. Looked at another way, the neighborhood $W_\Psi$ prevents the interest points in triplets from being undesirably scattered all over the image.

To derive the neighborhood $W_\Psi$, edges are linked into contours using simple "eight neighbors connectivity." Given a point $p_1 = (s_i, y_i)$ on a contour, points $p_1$ are symmetrically sampled around $p_1$ along the contour, thereby generating a neighborhood set $W=\{p_1=(x_1, y_1), -N \leq 1 \leq N\}$. The sampling step is proportional to the length of the longest symmetrical interval around the point $p_i$ for which the tangent behavior is monotonic on a coarse scale, and the total tangent variation is less than $2\pi/3$. It is also inversely proportional to the total variation in tangent angle on the symmetric interval if less than $2\pi/3$. An assumption is that faster variation in tangent correspond to smaller features which, accordingly, require finer sampling for detection. In this way, a quasi-scale invariant sampling of the contours is achieved. Next, triplets of interest points are derived. All possible combinations are formed of the point $(x_i, y_i)$ in conjunction with two others $p_j$ and $p_k$ from the set $\{p_1=(x_1, y_1), -N \leq 1 \leq N\}$. These combinations are made in FOR LOOPs 610,628 ($p_j$) and 612,626 ($P_k$), as shown. At block 614, it is insured that the same point is not selected twice when constructing the triplet combinations.

At block 616, the index $\eta_\Psi = (s_1/S, s_2/S, \alpha_1, \alpha_2)$, described herein in the section entitled, "Local Shape Table Creation", is computed for each triplet.

At block 618, the tuple index is now used to index into the local shape table 104 in order to retrieve the corresponding tuple entry $\zeta_\Psi = <\lambda, \rho, \alpha_T, \gamma>$.

Next computations are performed to generate a local shape descriptor hypothesis $\Psi$, as indicated in block 620. Specifically, from the $\rho$ and $\alpha_T$ of the tuple entry $\zeta_\Psi$, the possible scaler orientations of the contour are created. Note that the location of the contour is at $p_i$, and accordingly, the location of the contour need not be computed as with global shapes. Thus, only scale and rotation information need be computed.

At block 622, the parameter space $\Sigma_\Psi$ is examined to determine whether an LSD hypothesis already exists in the parameter space $\Sigma_\Psi$ for the contour at issue. If the LSD hypothesis $\Psi$ exists, then the existing LSD hypothesis $\Psi$ is merely updated by appending points $p_i$, $p_j$, $p_k$ to it. If the LSD hypothesis $\Psi$ does not exist, then the entry $\zeta_\Psi$ for $\Psi$ having the three points $p_i$, $p_j$, $p_k$ is created in the parameter space $\Sigma_\Psi$.

After completion of FOR LOOPs 618,624; 612,626; and 610,628, an LSD hypothesis $\Psi$ will have a high vote count, based upon votes accorded it by the points $p_1$, $p_j$, $P_k$. These points along with the corresponding LSD hypothesis $\Psi$ belong to the particular contour at issue.

Thus, at the next block 630 the LSD hypothesis $\Psi$ is adopted as the local shape descriptor $\Psi$ for $p_i$. For each point $p_i$, there exists a local shape descriptor $\Psi$ having a label $\psi$, a support mechanism 7, and a supporting point list p={p}.

After completion of Flowchart 600, a large set of local shape descriptors {$\Psi$} with exactly one LSD and corresponding to each interest point $p_1$ in the image is available for further mathematical manipulation.

In order to winnow down the number of LSDs $\Psi$ and to enhance the integrity of the LSDs, the local feature set {$\Psi_1$-$\Psi_N$} is filtered using any conventional filtering technique as discussed previously. In the preferred embodiment, a conventional best first technique is utilized and is illustrated at Flowchart 700 of FIG. 7. The Flowchart 700 is self explanatory. The resultant filtered set of LSDs, {$\Psi$} selected, is extremely smaller than the original set of LSDs $\Psi_1$-$\Psi_N$. The resultant filtered set is illustrated at reference numeral 106 in FIG. 1.

2. Object Shape Recognition

Figure 8:
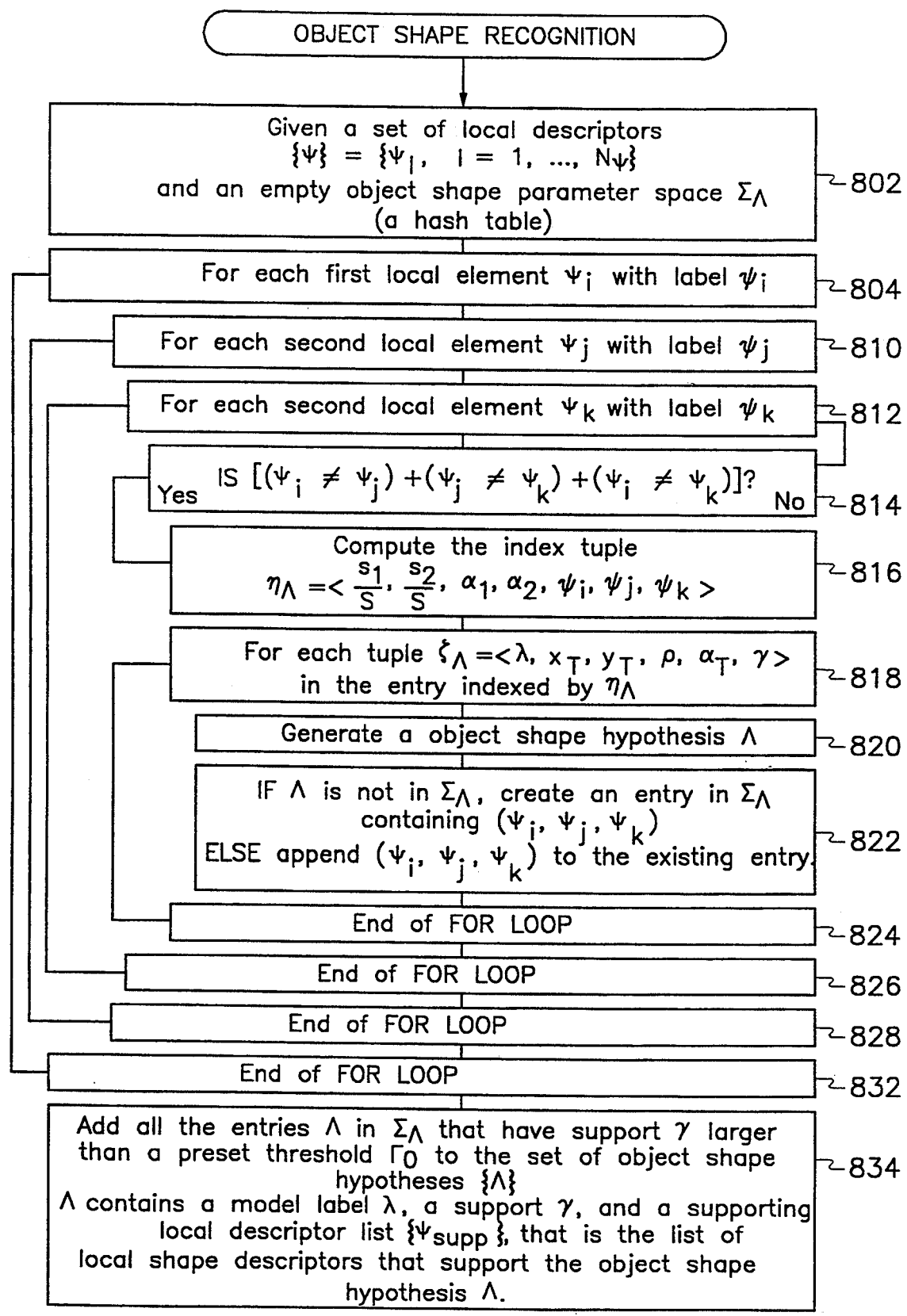
FIG. 8 shows a low level Flowchart for the recognition of object shapes based upon an analysis of the filtered local shape descriptors of FIG. 7 during the recognition phase.
Figure 9:
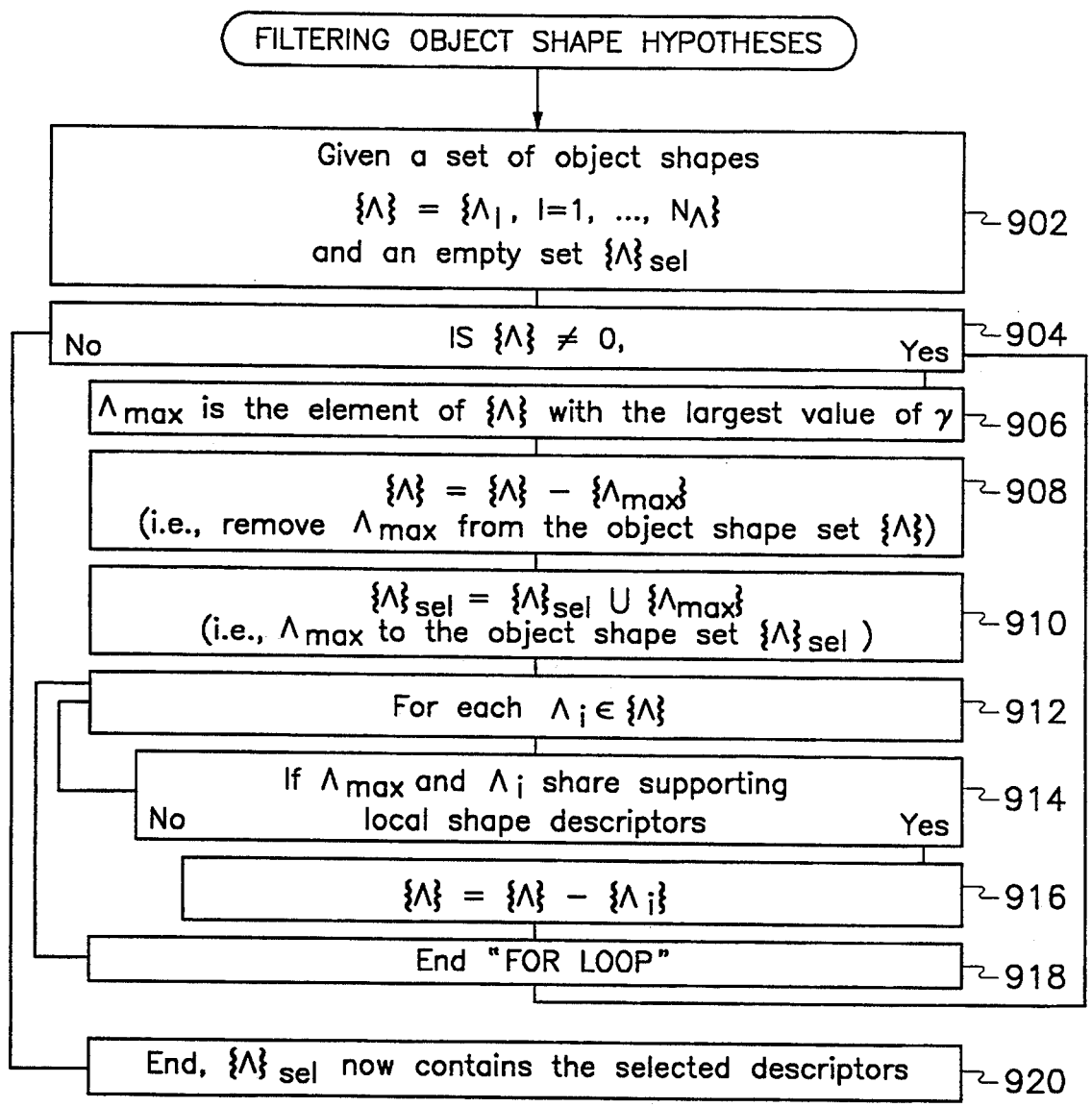
FIG. 9 illustrates a low level Flowchart for filtering the object shapes of FIG. 8 during the recognition phase.

FIG. 8 shows a Flowchart 800 for recognizing an object based upon the local feature set {$\Psi$}$_{selected}$, comprising the filtered LSDs $\Psi$. Flowchart 800 proceeds very similarly with respect to Flowchart 600. Accordingly, similar steps within referenced blocks are denoted with similar reference numerals in the Flowcharts 800 and 600 for easy comparison. However, some differences in methodology do exist.

In Flowchart 800, the focus is upon local curve shapes, not upon interest points as in Flowchart 600. Further, triplets in Flowchart 800 are formed from LSDs $\Psi$, not with interest points as in Flowchart 600. Finally, the global shape table 108 is consulted during the methodology of Flowchart 800, not the local shape table 104 as in Flowchart 600. Note that the index $\eta_\Psi$ corresponding with the global shape table 108 is larger than the index $\eta_\Lambda$ corresponding with the local shape table 104.

With reference to Flowchart 800, at a block 802, the N filtered LSDs $\Psi$ corresponding to the image are acquired.

Moreover, a temporary parameter space $\Sigma_\Lambda$ (a hash table) is generated for use in the proceeding steps of the Flowchart 800.

Next, a FOR LOOP enclosed by blocks 804 and 832 commences for each LSD $\Psi$ of the local feature set {$\Psi$}$_{selected}$. In the FOR LOOP 804,832, the parameter space $\Sigma_\Lambda$ is first cleared, as indicated in block 806.

Next, triplets of LSDs $\Psi$ are derived. All possible combinations are formed of the LSD $\Psi_i$ in conjunction with two others $\Psi_j$ and $\Psi_k$ from the local feature set {$\Psi$}$_{selected}$. These combinations are made in FOR LOOPs 810,828 ($\Psi_j$) and 612,626 ($\Psi_k$), as shown. At block 814, it is insured that the same LSD is not selected twice when constructing the triplet combinations.

At block 816, the index $\eta_A = <s_1/S, s_2/S, \alpha_1, \alpha_2, \psi_i, \psi_j, \psi_k>$, described herein in the section entitled, "Global Shape Table Creation", is computed for each LSD triplet.

At block 818, the index $\eta_A$ is now used to index into the global shape table 108 in order to retrieve the corresponding entry $\zeta_A = <\lambda, x_T, y_T, \rho, \alpha_T, \gamma>$.

Next, computations are performed to generate an object shape hypothesis $\Lambda$, as indicated in block 820. Specifically, from the $x_T$, $y_T$, $\rho$, $\alpha_T$ of the tuple entry $\zeta_A$, the possible orientations of the contour are created. In other words, scale, rotation, and translation information is computed.

At block 822, the parameter space $\Sigma_A$ is examined to determine whether an object shape hypothesis $\Lambda$ already exists in the parameter space $\Sigma_A$. If the object shape hypothesis $\Lambda$ already exists, then the existing object shape hypothesis $\Lambda$ is merely updated by appending $(\Psi_i, \Psi_j, \Psi_k)$ to it and incrementing its vote. If the object shape hypothesis $\Lambda$ does not exist, then the object shape instance $\Lambda$ having the triplet $\Psi_i, \Psi_j, \Psi_k$ is created in the parameter space $\Sigma_A$.

After completion of FOR LOOPs 818,824; 812,826; and 810,828, a number of object shape hypotheses $\{\Lambda\}$ will have a high vote count, based upon votes accorded it by the LSDs $\Psi_i, \Psi_j, \Psi_k$.

Thus, at the next block 834, the object shape hypotheses $\{\Lambda\}$ having a votes $\gamma$ above a preset threshold $\Gamma_0$ are adopted. For each $\Lambda$, there exists a unique model label a support $\gamma$, and a supporting LSD list $\{\Psi_{supp}\}$.

After completion of Flowchart 800, a set of object shape hypotheses $\{\Lambda\}$ corresponding with each LSD triplet in the image is available.

In order to enhance the integrity of the set of object shape hypotheses $\{\Lambda\}$, they are filtered using any conventional filtering technique as discussed previously. In the preferred embodiment, a conventional best first technique is utilized and is illustrated at Flowchart 900 of FIG. 9. The Flowchart 900 is self-explanatory. The resultant filtered set of LSDs, $\{\Lambda\}_{selected}$, is illustrated at reference numeral 110 in FIG. 1. The $\{\Lambda\}_{selected}$ constitute the object shape recognized and located in the image.

The foregoing description of the preferred embodiment of the present invention has been presented for purposes of illustration and description. It is not intended to be exhaustive or to limit the present invention to the precise form disclosed, and obviously many modifications and variations are possible in light of the above teachings. The particular embodiments were chosen and described in order to best explain the principles of the present invention and its practical application to those persons skilled in the art and to thereby enable those persons skilled in the art to best utilize the present invention in various embodiments and with various modifications as are suited to the particular use contemplated. It is intended that the scope of the present invention be broadly defined by the claims appended hereto.

The following is claimed:

1. A computer-implemented method for recognizing objects and for automatic acquisition of models of objects, comprising the steps of:
   (1) acquiring a model of an object, comprising,
      (a) digitizing said object to generate a digitized image;
      (b) detecting local shapes in said digitized image;
      (c) grouping three or more noncontinuous combinations of said local shapes to generate a first index;
      (d) generating an entry for each group of local shapes consisting of a name of said digitized image, and information about the translation, rotation, and scale of said digitized image; and
      (c) storing said entry in a shape table at said first index; and
   (2) recognizing a target object that appears in a physical scene, comprising,
      (a) digitizing said target object to generate a digitized target image;
      (b) detecting global shapes in said digitized target image;
      (c) grouping three or more noncontinuous combinations of said global shapes to generate a second index;
      (d) accessing said shape table and retrieving entries from said shape table that correspond to said second index;
      (e) collecting said retrieved entries from said shape table into a vote table; and
      (f) selecting said retrieved entry with a highest vote in order to recognize said target image.

2. The method of claim 1, further comprising the steps of:
   creating a local lookup table;
   entering local shapes to be recognized by the system into said local lookup table by synthetic generation; and
   using said local lookup table to detect local shapes in said digitized image.

3. The method of claim 1, further comprising the steps of:
   transforming three or more edge points of said digitized image into local groupings;
   analyzing said local groupings in a parameter space;
   comparing the geometric characteristics of said local groupings with local shape entries in a local lookup table;
   according votes to said local shape entries which correspond with said geometric characteristics; and
   adopting local shape descriptors corresponding to local shape entries which have a high number of votes.

4. The method of claim 1, further comprising the steps of:
   converting three or more local shapes of said digitized target image into global groupings;
   analyzing said global groupings in a parameter space;
   comparing the geometric characteristics of said global groupings with global shape entries in said shape table;
   according votes to said global shape entries which correspond with said geometric characteristics; and
   adopting global shape descriptors corresponding to global shape entries which have a high number of votes.

5. A computer-based system for recognizing objects and for automatic acquisition of models of objects, comprising:
   (a) means for acquiring a model of an object, comprising, (1) means for digitizing said object to generate a digitized image;

(2) means for detecting local shapes in said digitized image;

(3) means for grouping three or more noncontinuous combinations of said local shapes to generate a first index;

(4) means for generating an entry for each group of local shapes consisting of a name of said digitized image, and information about the translation, rotation, and scale of said digitized image; and (5) a shape table;

(6) means for storing said entry in said shape table at said first index; and (b) means for recognizing a target object that appears in a physical scene, comprising, (1) means for digitizing said target object to generate a digitized target image;

(2) means for detecting global shapes in said digitized target image;

(3) means for grouping three or more noncontinuous combinations of said global shapes to generate a second index;

(4) means for accessing said shape table and for retrieving entries from said shape table that correspond to said second index;

(5) means for collecting said retrieved entries from said shape table into a vote table and for selecting said retrieved entry with a highest vote in order to recognize said target.

6. The computer-based system of claim 5, further comprising:

(a) a camera adapted for viewing said target object and producing a signal indicative of said target object; and (b) a digitizer, connected to said camera, for digitizing said target object represented by said signal and storing said digitized target image in a storage medium.

7. The computer-based system of claim 5, further comprising:

a local shape table;

means for entering local shapes to be recognized into said local shape table by synthetic generation; and means for using said local shape table to detect local shapes in said digitized image.

8. The computer-based system of claim 5, further comprising:

means for transforming three or more edge points of said digitized image into local groupings;

means for analyzing said local groupings in a parameter space;

means for comparing the geometric characteristics of said local groupings with local shape entries in a local lookup table;

means for according votes to said local shape entries which correspond with said geometric characteristics; and means for adopting local shape descriptors corresponding to local shape entries which have a high number of votes.

9. The computer-based system of claim 5, further comprising:

means for converting three or more local shapes of said digitized target image into global groupings;

means for analyzing said global groupings in a parameter space;

means for comparing the geometric characteristics of said global groupings with global shape entries in said global shape table;

means for according votes to said global shape entries which correspond with said geometric characteristics; and means for adopting global shape descriptors corresponding to global shape entries which have a high number of votes.

10. The computer-based system of claim 5, further comprising:

means for generating a recognition signal from said selected retrieved entry, wherein said recognition signal is indicative of a recognized target object.

* * * * *

UNITED STATES PATENT AND TRADEMARK OFFICE
CERTIFICATE OF CORRECTION

PATENT NO. : 5,351,310
DATED : September 27, 1994
INVENTOR(S) : Andrea Califano, et al It is certified that error appears in the above-indentified patent and that said Letters Patent is hereby corrected as shown below:

Column 1, line 23, replace "elated" with --related--; and
        line 28, after "advance" insert --in--.

Column 2, line 60, delete "the" (second occurrence).

Column 3, line 16, after "pp.1" insert --,--.

Column 4, line 23, replace "commercially" with --commercial--;
        line 48, after "for" insert --the--;
        line 62, replace "for filtering" with --for the filtering of--.

Column 5, line 1, replace "for filtering" with --for the filtering of--; and
        line 35, after "entry" insert --$\int_v$--.

UNITED STATES PATENT AND TRADEMARK OFFICE
CERTIFICATE OF CORRECTION

PATENT NO. : 5,351,310

DATED : September 27, 1994

INVENTOR(S) : Andrea Califano, et al.

It is certified that error appears in the above-indentified patent and that said Letters Patent is hereby corrected as shown below:

Column 6, line 1, after "are" insert --used to derive local shape descriptors (LSD) $\{\Psi\}$. Each LSD--;
  line 32, replace "$\oplus$" with --$\beta$--;
  line 41, replace "A" with --$\Lambda$--;
  line 44, after "index" insert --$\zeta_\Lambda$--; and
  line 54, after "parameters" insert --$\phi$--.

Column 7, lines 30-31, delete "as shown in a block 302,";
  line 40, after "label" insert --$\psi$--; and
  line 63, replace "," (first occurrence) with --*--.

Column 8, line 8, replace "$\eta_\Psi$" with --$\zeta_\Psi$--;
  line 22, replace "p" with --$p_1$--;
  line 29, after "$\alpha_T$" insert --,--;
  line 31, after "$\alpha_T$" insert --,--;
  line 36, delete "." (first occurrence); and
  line 38, after "entries" insert --$\zeta$--.

UNITED STATES PATENT AND TRADEMARK OFFICE
CERTIFICATE OF CORRECTION

PATENT NO. : 5,351,310
DATED : September 27, 1994
INVENTOR(S) : Andrea Califano, et al.

It is certified that error appears in the above-indentified patent and that said Letters Patent is hereby corrected as shown below:

Column 9, line 36, replace "$\eta_A$" with --$\eta_A$--;
          line 37, replace "A" with --$\eta_A$--; and
          line 47, replace "$1^{th}$" with --$1^{st}$--.

Column 10, line 68, after "Hypotheses'" insert --,--; and
           line 68, after "9" insert --.--

Column 11, line 10, after "phase" insert --.--;
           line 28, replace "W," with --$W_\Psi$--;
           line 31, replace "W" with --$W_\Psi$--;
           line 36, replace "$p_1$" (first occurrence) with --$p_i$--;
           line 37, replace "$p_1$" with --$p_i$--; and
           line 60, after "index" (first occurrence) insert --$\eta_\Psi$--.

Column 12, line 4, after "hypothesis" insert --$\Psi$--;
           line 14, replace "$P_k$" with --$p_k$--;
           line 19, replace "7" with --$\gamma$--;
           line 20, replace "p" (first occurrence) with --P--;
           line 23, replace "$p_1$" with --$p_i$--; and
           line 32, replace "$\{\Psi\}$selected" with --$\{\Psi\}_{selected}$--.

UNITED STATES PATENT AND TRADEMARK OFFICE
CERTIFICATE OF CORRECTION

PATENT NO. : 5,351,310
DATED : September 27, 1994
INVENTOR(S) : Andrea Califano, et al.

It is certified that error appears in the above-indentified patent and that said Letters Patent is hereby corrected as shown below:

Column 13, line 31, after "label" insert --$\lambda_r$--.

Column 14, line 9, replace "(c)" with --(e)--.

Column 15, line 19, replace "global" with --local--;

line 30, after "target" insert --image--.

Signed and Sealed this

Twenty-sixth Day of December, 1995

Attest:

BRUCE LEHMAN

Attesting Officer

Commissioner of Patents and Trademarks